United States Patent [19]
Kuppermann et al.
[11] 4,314,156
[45] Feb. 2, 1982

[54] AUTOMATED MASS SPECTROMETER ANALYSIS SYSTEM

[75] Inventors: Aron Kuppermann; William J. Dreyer, both of Altadena; Charles E. Giffin, Pasadena; Heinz G. Boettger, La Canada, all of Calif.

[73] Assignee: California Institute of Technology, Pasadena, Calif.

[21] Appl. No.: 85,414

[22] Filed: Oct. 6, 1979

Related U.S. Application Data

[63] Continuation of Ser. No. 892,409, Mar. 31, 1979, abandoned, which is a continuation-in-part of Ser. No. 587,097, Jun. 16, 1975, Pat. No. 4,084,090.

[51] Int. Cl.[3] .............. B01D 59/44
[52] U.S. Cl. .............. 250/281; 250/282; 250/286; 250/290
[58] Field of Search .............. 250/281, 290, 282, 286

[56] References Cited

U.S. PATENT DOCUMENTS 3,824,390 7/1974 Magyar .............. 250/294
4,008,388 2/1977 McLafferty .............. 250/281

*Primary Examiner*—Harold A. Dixon
*Attorney, Agent, or Firm*—Freilich, Hornbaker, Wasserman, Rosen & Fernandez

[57] ABSTRACT

An automated mass spectrometer analysis system is disclosed, in which samples are automatically processed in a sample processor and converted into volatilizable samples, or their characteristic volatilizable derivatives. Each volatilizable sample is sequentially volatilized and analyzed in a double focusing mass spectrometer, whose output is in the form of separate ion beams all of which are simultaneously focused in a focal plane. Each ion beam is indicative of a different sample component or different fragments of one or more sample components and the beam intensity is related to the relative abundance of the sample component. The system includes an electro-optical ion detector which automatically and simultaneously converts the ion beams, first into electron beams which in turn produce a related image which is transferred to the target of a vilicon unit. The latter converts the images into electrical signals which are supplied to a data processor, whose output is a list of the components of the analyzed sample and their abundances. The system is under the control of a master control unit, which in addition to monitoring and controlling various power sources, controls the automatic operation of the system under expected and some unexpected conditions and further protects various critical parts of the system from damage due to particularly abnormal conditions.

28 Claims, 8 Drawing Figures

FIG. 5
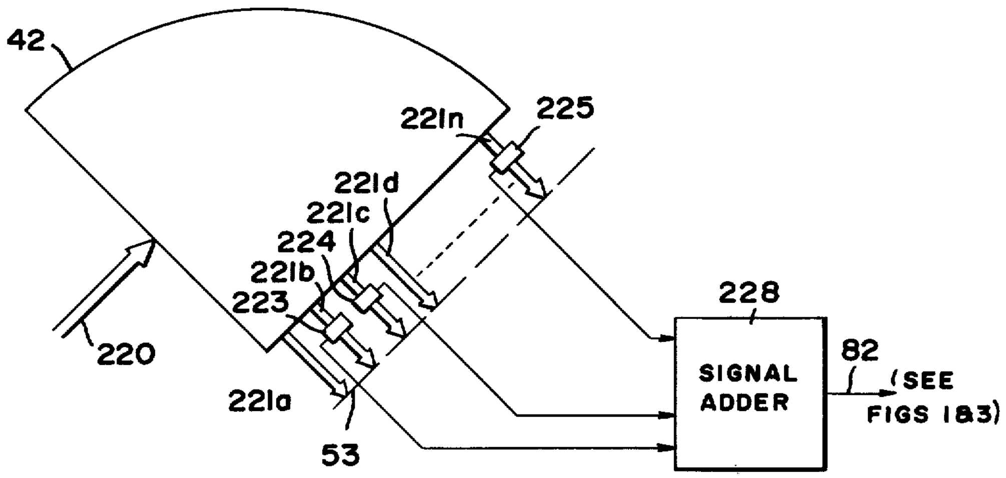
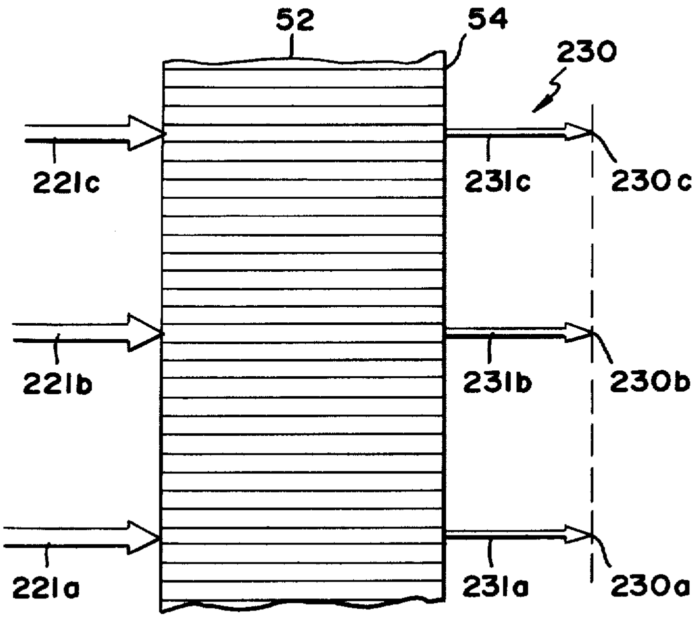
FIG. 6

AUTOMATED MASS SPECTROMETER ANALYSIS SYSTEM

ORIGIN OF THE INVENTION

The invention described herein was made in part in the performance of work under a NASA contract and is subject to the provisions of Section 305 of the National Aeronautics and Space Act of 1958, Public Law 85-568 (72 Stat. 435; 42 USC 2457).

CROSS REFERENCES TO A RELATED APPLICATION

This is a continuation, of application Ser. No. 892,409, filed Mar. 31, 1979 and now abandoned, which is a Continuation-in-Part of application Ser. No. 587,097, filed June 16, 1975, now U.S. Pat. No. 4,084,090.

BACKGROUND OF THE INVENTION

1. Field of the Invention

The present invention generally relates to an automated analysis system and, more particularly, to an automated mass spectrometer analysis system finding particular utility, though not limited to, in automatically analyzing samples in biological matrices and providing an indication of identified sample components and their abundances.

2. Description of the Prior Art

The increasing realization of the molecular origin of health disease has led to a rapid expansion of our knowledge regarding body metabolism. Therefore, development of methods for the assay of a wide variety of complex organic compounds in biological matrices, such as blood or urine, is of interest to the clinical chemist. Presently, the relatively high cost per analysis and low sample throughput have made such analyses, in general, prohibitive for routine work.

For an analysis system to be of use to the biomedical researcher and clinical chemist it must meet a number of requirements. To be justified economically the system should operate automatically with a high degree of reliability, requiring minimum operator attention or maintenance, and have a high sample throughput, so that the cost per analysis can be held to a minimum. The system should be able to operate with very small sample volumes, be capable of determining a large number of compounds at very low level of concentration simultaneously, to conserve both time and sample. Although various systems for automatically or semi-automatically analyzing samples, present in blood or urine, have been proposed, all of them are in their early stages of development and to date do not meet the above enumerated requirements. Prior art systems which are in the early stages of development include the combination of a gas or liquid chromatograph, a mass spectrometer and a data processor, e.g., a computer. Among the problems which the prior art has not solved is the simultaneous conversion of the complete mass spectrometer output over a wide range of masses, into signals which the computer can use to provide an indication of the analyzed sample components and their abundances. Also, the automatic processing of samples, their successive introduction into a mass spectrometer and the overall control of such a system, so that it can operate automatically with minimum operator intervention and with a high degree of reliability have not been solved.

OBJECTS AND SUMMARY OF THE INVENTION

It is a primary object of the present invention to provide a new automated mass spectrometer analysis system.

Another object of the invention is to provide an analysis system in which small volumes of volatilizable samples or their characteristic volatilizable derivatives are analyzed automatically, to simultaneously determine each sample's components and their abundances with a high degree of accuracy, with minimum operator attention and with a high sample throughput rate.

These and other objects of the invention are achieved by providing a system which includes the following subsystems:

(a) a sample processor;

(b) a mass spectrometer;

(c) an electro-optical ion detector; and (d) a data processor.

The various subsystems are under the control of a control unit which insures the proper automatic operation of the entire system. Briefly, the sample processor successively receives samples to be analyzed in separate identifiable cartridges. In the sample processor the samples are converted into their characteristic volatilizable derivatives, hereinafter simply referred to as volatilizable samples. These volatilizable samples are successively volatilized and injected into the mass spectrometer. Therein, each volatilized sample is first ionized to form an ion beam which is then dispersed into separate ion beams, based on the mass-to-charge ratios of the ions. All the ion beams are focused simultaneously at a common focal plane. The electro-optical ion detector first converts the ion beams into separate electron beams which are used to produce separate images. Thereafter the separate images are converted into electrical signals, which are supplied to and processed in the data processor, which provides a list of identified components of the original sample and their abundances. The control unit is connected to the various subsystems so as to insure proper automatic operation of the system. In addition to monitoring the various voltages and currents supplied to various parts of the subsystems the control unit protects various parts of some of the subsystems from becoming oversaturated or damaged due to other than normally expected operating conditions. The control unit also controls the transfer of the electrical signals to the data processor. Upon completion of the transfer of the electrical signals to the data processor and after the sample has been determined to have been fully ionized the control system commands the transfer from the sample processor of another volatilizable sample to a volatilization chamber and its subsequent injection into the mass spectrometer for analysis.

The novel features of the invention are set forth with particularity in the appended claims. The invention will best be understood from the following description when read in conjunction with the accompanying drawings.

BRIEF DESCRIPTION OF THE DRAWINGS

FIGS. 5 and 6 are partial diagrams useful in explaining other embodiments of the invention.

DESCRIPTION OF THE PREFERRED EMBODIMENTS

Figure 1:
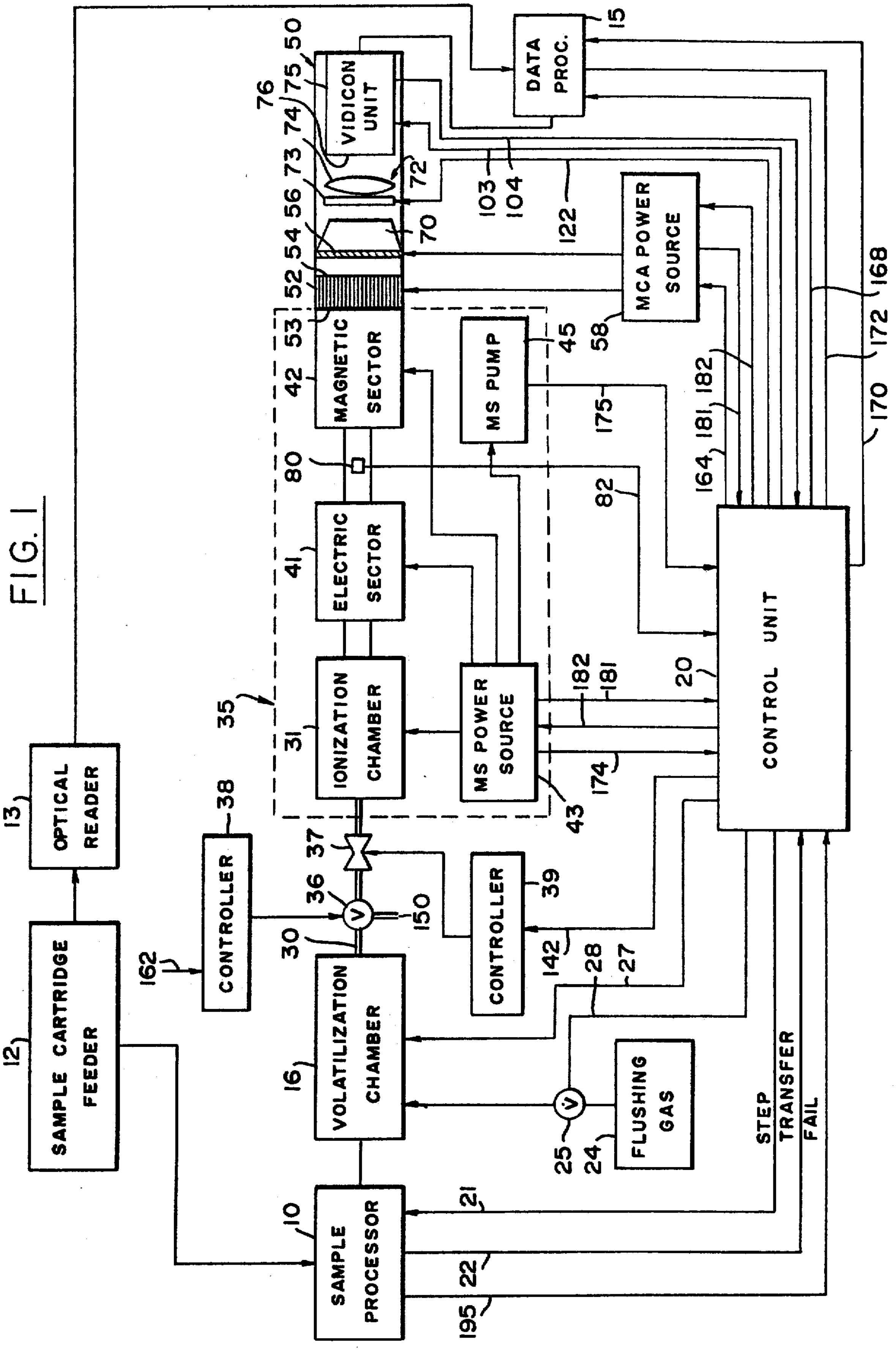
FIG. 1 is an overall block diagram of the present invention.

Attention is first directed to FIG. 1 which is a general block diagram of one embodiment of the present invention. Therein, a sample processor 10 is shown connected to a sample cartridge feeder 12. The latter receives samples to be analyzed in separate cartridges and sequentially feeds them into the sample processor. Each cartridge is assumed to include a sample identification tag which is read by an optical reader 13 whose output is supplied to a data processor 15. The data processor stores the sample identification and after the sample has been analyzed and processed, as will be described hereinafter, the data processor outputs the results for each of the previously identified samples. The processor 15 can be thought of as "output means".

The function of the sample processor 10 is to automatically convert each incoming sample from feeder 12 into a volatilizable sample or its characteristic volatilizable derivative, which can be volatilized and thereafter injected into a mass spectrometer (MS) for analysis. This is achievable by sequentially positioning each of the incoming samples from feeder 12 at various chemical processing stations so as to convert each incoming sample into a corresponding volatilizable sample or its characteristic volatilizable derivative, which is contained in a separate cartridge.

The chemical processing which each sample undergoes in the sample processor 10 depends of course on the type of sample to be analyzed. One protocol, e.g., preparation of amino acids phenyl-thiohydanton is to detect amino acids in an incoming sample may include the following process steps:

(1) drying the contents of each incoming cartridge with nitrogen under reduced pressures, (2) coupling of the amino acids with phenyl-isothiocyanate, (3) cyclization of the condensation product to the 2-amino-5 thiazolinone derivative, and (4) isomerization of the thiazolinone to the hydanton, which represents the characteristic volatilizable derivative of amino acids.

Clearly, to analyze samples to detect other components different protocols will be employed in the sample processors, in order to convert each sample to be analyzed into its volatilizable state (or into its characteristic volatilizable derivative). For explanatory purposes, the output of the sample processor 10 can be thought of as a sequence of volatilizable samples contained in separate cartridges.

Many automated sample processors, often referred to as automated analyzers, are described in the literature and in various U.S. patents, and some are available commercially. Therefore, the sample processor 10 will not be described in further detail.

As shown in FIG. 1 the processor 10 is connected to a volatilization chamber 16 and to a control unit 20. As will be apparent from the following description the control unit 20 provides various control signals, some of which are used to control the conversion of ion beams into electrical signals. Thus, unit 20 can be thought of as "control means". The sample processor 10 is assumed to include a cartridge transfer mechanism (not shown). Upon receiving a signal representing a STEP command from control unit 20 on line 21, the processor 10, by means of its transfer mechanism ejects a cartridge which was previously transferred into the chamber 16 with a volatilizable sample and transfers the next cartridge with a volatilizable sample in the sequence into the chamber 16. When the transfer is completed, the sample processor 10 provides a Transfer signal to the control unit 20 on line 22, thereby indicating that a new volatilizable sample is present in the volatilization chamber 16. For explanatory purposes, it is assumed that the sample processor 10 is capable of providing a new volatilizable sample for transfer to the chamber 16 once every few minutes, e.g., 2 minutes.

The volatilization chamber 16 is assumed to include a heater (not shown). As shown in FIG. 1, the chamber 16 is connected to a source of flushing gas 24 through a control valve 25. The control unit 20 upon receiving the Transfer signal from the sample processor on line 22, which indicates that a new volatilizable sample has been transferred to the chamber 16, activates the heater of the chamber by means of a signal tranmitted thereto via line 27. Consequently, the sample in chamber 16 is volatilized. In addition the control unit activates value 25 to enable flushing gas from source 24 to flow into chamber 16 in order to flush out the volatilized sample therefrom into conduit 30 for injection into the ionization chamber 31 of a mass spectrometer (MS) 35. As shown in FIG. 1 valves 36 and 37 which are respectively controlled by their controllers 38 and 39 are interposed between the volatilization chamber 16 and the ionization chamber 31. The function of these valves will be described hereinafter in detail. At this point in the explanation it is sufficient to assume that these valves are used to control the rate of flow of the volatilized sample into the ionization chamber. A separator may be included in order to remove as much of the flushing gas from the mixture flowing to the ionization chamber, so that only the volatilized sample with a minimum amount of the flushing gas are injected into the ionization chamber.

For explanatory purposes, the MS 35 is assumed to be of the double focusing type with an electric sector 41 and a magnetic sector 42. It also includes a power source 43 which provides the necessary currents and voltages to the ionization chamber 31, the sectors 41 and 42, and to the MS pump 45. Such MSs are available commercially. For explanatory purposes the MS 35 is assumed to be of the Mattauch-Herzog type. As is appreciated by those familiar with the art of mass spectrometry in such an MS the ionized molecules in the ionization chamber 31 exit therefrom and pass through the electric sector 41, exiting the latter as a single ion beam with ions of a selected energy range. As the single ion beam enters the magnetic sector 42 it is separated into several beams in accordance with the ions' mass-to-charge ratios. Typically each ion beam contains ions of a different atomic mass unit (amu). All of the separated ion beams are focused at the MSs focal plane at the exit end of the magnetic sector 42.

In a conventional Mattauch-Herzog MS a photographic plate is placed at the focal plane and is exposed by the different ion beams. After exposure the photographic plate is developed. The points of exposure along the length of the plate are indicative of the components of the analyzed sample, and the levels of exposures, corresponding to the beams' intensities are indicative of the abundances of the various detected components.

Unlike the prior art in which the photographic plate is exposed by the dispersed ion beams at the focal plane, in accordance with the present invention an electro-optical ion detector (BOID) 50 is used to respond to the dispersed ion beams and automatically produce electrical signals which are indicative of the detected components of the analyzed samples and their abundances. The EOID 50 can be thought of as "detection means" or "ion converting means" which simultaneously converts focused ion beams, i.e. ion beams at the focal plane into electrical signals. The EOID 50 includes a microchannel electron multiplier array 52, which hereinafter will be referred to as MCA 52. The front end 53 of MCA 52 is located at the MS focal plane and its back end 54 is spaced apart from a phosphored plate 56. An MCA power source 58 applies a potential difference across the MCA 52, as well as a potential difference between the array back end 54 and the plate 56. The MCA 52 is positioned at the focal plane so that ions of separate beams enter simultaneously the microchannels of the MCA. Therein the ions produce secondary electrons which exit the back end 54 in the form of separate electron beams which are accelerated to the plate 56, producing images thereon.

Figure 2A:
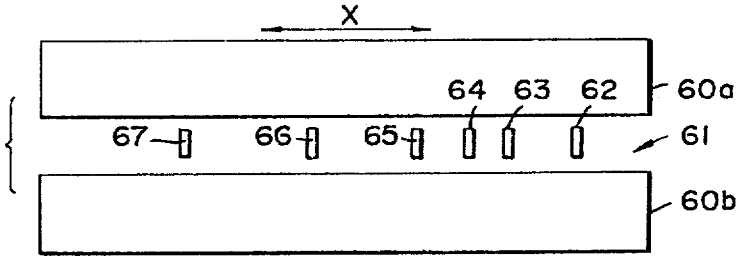
FIGS. 2*a*-2*c* are diagrams useful in explaining some functions of an electro-optical ion detector, shown in FIG. 1.
Figure 2B:
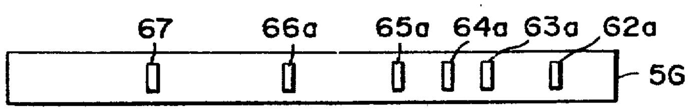

This aspect of the EOID 50 may further be explained in connection with FIGS. 2*a* and 2*b*. FIG. 2*a* is a view of the magnetic sector 42 as viewed from MCA 52. In FIG. 2*a*, numerals 60*a* and 60*b* designate the magnet's pole pieces which are spaced apart to form the magnetic gap 61 in which ion beams 62–67 are shown dispersed along an axis designated X, and focused at the focal plane. As is known, in a Mattauch-Herzog MS many ion groups are detectable simultaneously over a wide mass range 36:1, such as 28–1000 amu with good resolution of over 100 lines/mn. The ion beams are dispersable in the X axis over a length on the order of 360 mm. The beams are of uniform height. Generally, a mask (not shown) is placed near the focal plane to reduce the beams' height to be less than the gap width. For explanatory purposes only a beam height of 0.4 mm is assumed. In FIG. 2*a*, only 6 ion beams, dispersed in the X axis and designated by numerals 62–67 are shown. It is these ion beams which are converted by the MCA 52 into electron beams which in turn produce corresponding images 62*a*–67*a* on the phosphored plate 56, as shown in FIG. 2*b*. The intensity of each of these images is directly related to the intensity of its corresponding ion beam. With an assumed beam height of 0.4 mm and a beam dispersion in the X axis of 360 mm the phosphored plate should be at least 360 mm long and at least 0.4 mm wide. Images would be produced on the plate over an area of $0.4 \times 360 = 144\ mm^2$.

Figure 2C:
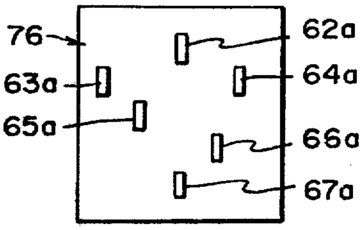

The EOID 50 includes optical fibers or rods designated by numeral 70 (see FIG. 1) and generally referred to as fiber optics. If desired the tips of the fiber optics 70 facing back end 54 of MCA 52 may be coated with phosphor to form a phosphor surface 56 instead of plate 56. Hereinafter however it will be referred to as the phosphored plate 56. EOID 50 also includes an optical arrangement 72, consisting of a shutter-diaphragm unit 73 and a lens 74. EOID 50 also includes a vidicon unit 75 with a target 76, which is typically square shaped. Briefly, the fiber optics 70 which are in contact with the plate 56 convert the long rectangularly shaped image format on the phosphored plate, as shown in FIG. 2*b*, into a square shaped format compatible with the target 76 dimensions. The images on the phosphored plate are transferred by the fiber optics to expose the target 76 through the optical arrangement 72 whose function will be described hereinafter. Assuming that the active target 76 is $12.7\ mm \times 12.7\ mm = 151\ mm^2$ incorporating $2.5 \times 10^5$ picture elements, 28 folds of the fiber optics are required to project the images in 28 different rows on the target surface. FIG. 2*c* is a simplified view of the target 76 with the images 62*a*–67*a* exposed thereon on several different lines.

As is appreciated a vidicon unit or camera is a device capable of converting the images which exposed its target into corresponding electrical signals by scanning the target. After the images have been transferred into corresponding electrical signals, generally referred to as READ operation, the target is effectively erased of the previously exposing images and is in condition to be exposed by new images.

In the present invention the vidicon unit 75 converts the images on its target 76 to electrical signals which are supplied to the data processor 15. Therein, the received electrical signals, which are related to the locations of the images on the target and their intensities, are processed. The data processor 15 provides an output indicating the identified components of the analyzed sample, based on the images' locations which correspond to ions of different amu values, and their abundances, based on the images' intensities.

From the foregoing it should be appreciated that in the system of the present invention volatilizable samples are successively volatilized and thereafter analyzed by MS 35 whose output, in the form of dispersed ion beams of different intensities, is indicative of the sample components and their abundances. These separate ion beams are simultaneously converted, first into electron beams and thereafter into corresponding photon images. These images expose the target of the vidicon unit, which converts the images into electrical signals which are supplied to the data processor for processing.

The data processor 15 is assumed to be of the type including a data storage capacitor, so that it can receive signals from the vidicon unit 75 as a result of an analyzed sample while still processing signals received from the analysis of a previously analyzed sample. However, the rest of the system is controlled so that once a volatilizable sample is introduced into chamber 16 it remains therein until the sample is analyzed and the electrical signals from the vidicon unit have been transferred to the data processor and the vidicon unit is ready for subsequent exposure before a new sample is introduced into chamber 16. Also since the amount of volatilizable sample may vary from one sample to another the system has to be controlled to protect particularly sensitive parts thereof from becoming adversely affected by such variations. For example, the ionization chamber 31 need be protected from an excessive rate flow of volatilized sample to be ionized so as not to become saturated with ionizable matter. The vidicon unit target 76 has to be protected from becoming overexposed and the MCA 52 has to be protected from excessive ion beam currents which may permanently damage it.

Figure 4:
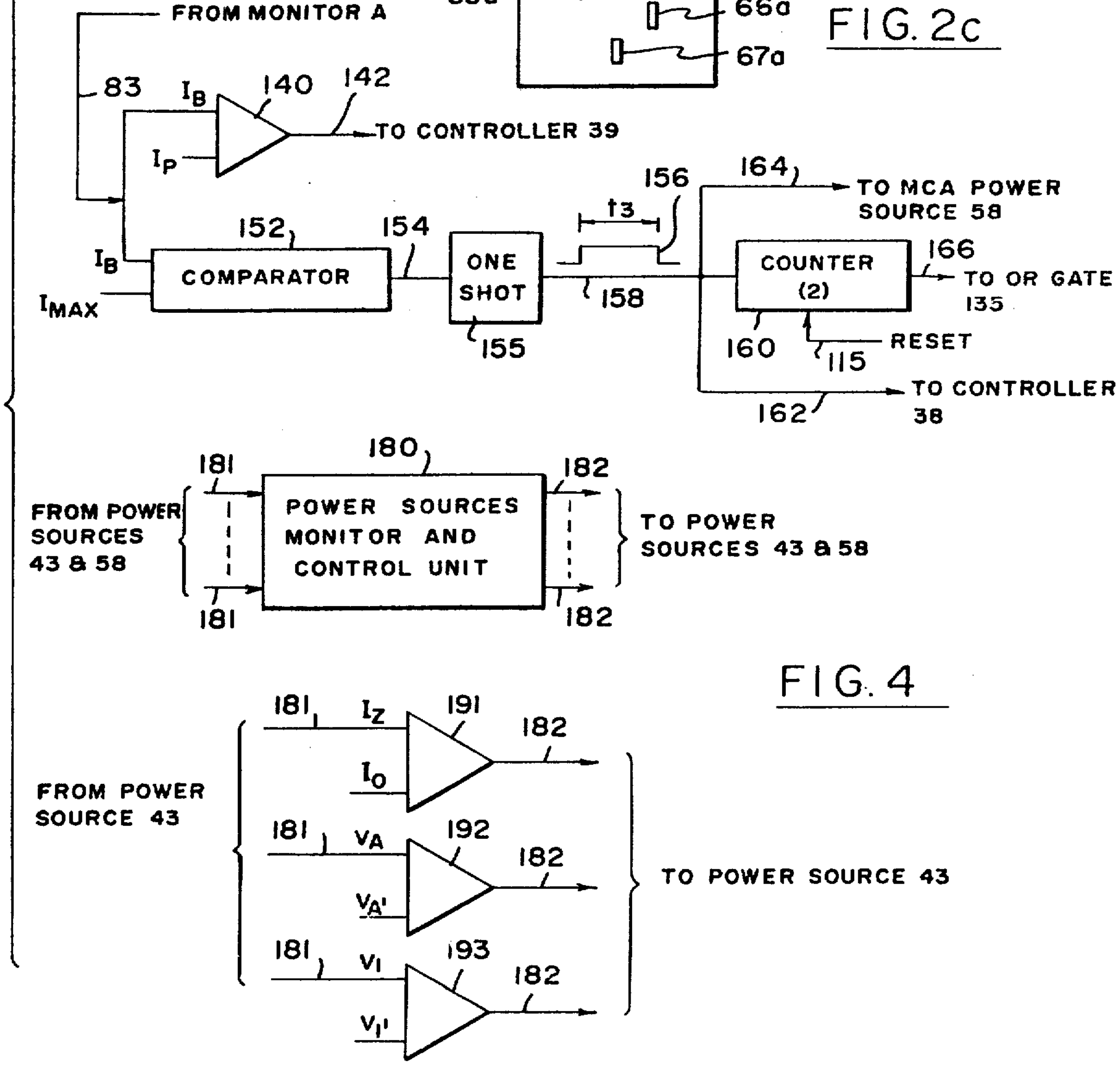
FIGS. 3 and 4 are logic diagrams of circuitry included in a control unit, shown in FIG. 1.
Figure 3:
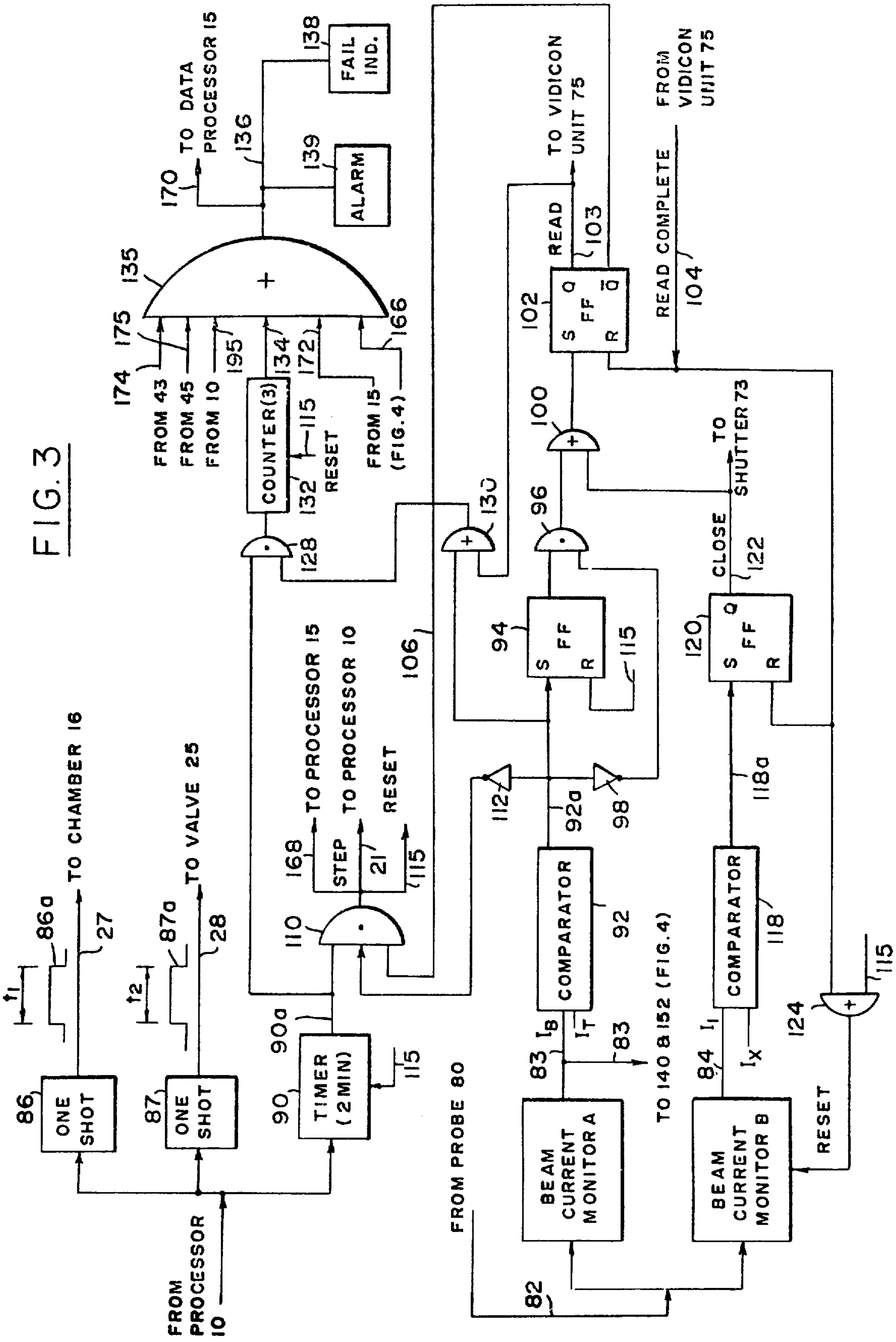

The various controls necessary for the proper automatic operation of the system are provided by the control unit 20, which will be described in connection with FIGS. 3 and 4. However, before describing the control unit, attention is briefly directed to FIG. 1 wherein an ion beam current probe 80 is shown positioned between the electric and magnetic sectors of MS 35. The function of this probe 80 is to measure the current in the total ion beam before it is dispersed into a plurality of beams in the magnetic sector 42. The probe 80 is shown connected to the control unit 20 by line 82. As shown in FIG. 3, line 82 is connected to the beam current monitors A and B, hereinafter simply referred to as monitors A and B.

Monitor A, in response to the signal from probe 80, provides an output on line 83 which is indicative of the instantaneous peak current in the ion beam. Monitor B on the other hand is of the integrating type, providing an output on line 84 which represents the integrated current from a point in time when the monitor B was reset. Such monitors are presently available and are often included in a commercial Mattauch-Herzog MS. In FIG. 3 the instantaneous beam current from monitor A is designated by $I_B$ and the integrated current from monitor B by $I_I$. As will be described hereinafter the integrated current $I_I$ is used to protect the vidicon target from overexposure.

As previously explained when a volatilizable sample is transferred to chamber 16 from processor 10 a Transfer signal is sent by the sample processor 10 to unit 20 via line 22. The control unit 20 is assumed to include two one shots 86 and 87 and timer or clock 90 each of which is activated by the Transfer signal on line 22. One shot 86 provides a pulse 86*a* of duration $t_1$ on line 27, thereby activating the heater in chamber 16 for the duration $t_1$. One shot 86 on the other hand provides a pulse 87*a* of a duration $t_2$ on line 28, thereby switching valve 25 (see FIG. 1) for the duration $t_2$ to enable flushing gas to flow from source 24 to chamber 16. If desired the one shot 87 may be activated after one shot 86 by inserting a delay unit between one shot 87 and line 22. Such delay may be desirable to cause flushing gas to flow into chamber 16 only after some of the sample was already volatilized therein. Volatilization time on the order of 15 seconds or less can be achieved quite easily. As the sample is volatilized it flows from chamber 16 through conduit 30 to the ionization chamber 31 wherein it is ionized. The instantaneous beam current $I_B$ is continuously monitored by comparing it with a threshold reference current $I_T$ in a comparator 92. The output of the latter on line 92*a* is assumed to be true or high whenever $I_B \geqq I_T$ and false or low when $I_B < I_T$.

As the ionization takes place and $I_B$ increases, when $I_B \geqq I_T$ line 92*a* goes high thereby setting a flip flop (FF) 94 so that its Q output, which is connected to an AND gate 96 goes high. As shown in FIG. 3 the comparator output line 92 is connected to an inverter 98 whose output is connected to the other input of AND gate 96. As long as $I_B \geqq I_T$ the output of inverter 98 is low and therefore AND gate 96 is disabled. However, after the sample has been ionized and passed through sector 41 into sector 42, the beam current drops. When $I_B < I_T$ which is assumed to occur after the practically complete ionization of the sample, the output of inverter 98 goes high, thereby enabling gate 96, which through OR gate 100 sets FF102, so that its Q output on line 103 goes high. When line 103 goes high it represents a READ signal which is supplied to the vidicon unit 75.

In response thereto the vidicon unit scans its target 76 in a manner well known in the art and converts the images thereon into electrical signals which are supplied to the data processor 15, as hereinbefore described. Upon completing the READ operation when the target surface has been sufficiently de-energized and is ready to be re-exposed a READ COMPLETE signal is supplied by the vidicon unit 75 to the control unit on line 104. This signal resets FF102 so that its Q output on line 106 goes high. This line is shown as one input to a three-input AND gate 110. Another input to gate 110 is the output of an inverter 112 which goes high when $I_B < I_T$. The third input of gate 110 is the output of the timer or clock 90 which is connected to line 22.

The throughput of the system is primarily dependent on the rate at which the processor 10 can supply volatilizable samples to chamber 16. The volatilization of the sample, its ionization and dispersion in the MS as well as the time required by the vidicon camera to read its exposed target generally requires less than 1 minute. Assuming however that the rate at which volatilization samples can be supplied by processor 10 is one sample every 2 minutes, timer 90 is a two minute timer, providing a pulse at the end of every two minutes. The first two minute period starts with the Transfer signal received on line 22, from sample processor 10.

At the end of the first two minute period timer 90 provides a pulse on its output line 90*a* which is connected as the third input to AND gate 110. The timer 90 is assumed to be a binary counter which provides the end of two-minute pulse when it is in an all zero state. If at this instant $I_B < I_T$, indicating that the entire sample has been analyzed so that the beam current $I_B$ is less than the threshold current $I_T$, the output of inverter 112 is high. Also, if the vidicon camera has completed its READ operation line 106 is high. Consequently gate 110 is enabled, providing a high output on line 21. When line 21 is high it represents the Step signal which is supplied to the sample processor 10, as hereinbefore explained. In response thereto the processor ejects the cartridge previously inserted in chamber 16 and transfers thereto a new volatilizable sample.

When AND gate 110 is enabled it also provides a high output on line 115 which is connected to line 21. When line 115 is high it resets various circuits in the control unit. Therefore line 115 can be thought of as the Reset line. Of the circuits described so far when Reset line 115 is high the timer 90 is reset through an OR gate 116. When the timer is reset it is driven to a zero time reference (as all zero state) and held therein until reactivated by a subsequent Transfer pulse on line 22. Also the Reset line 115 is connected to FF 94 to reset it.

Under normal operation in which the amount of sample to be analyzed does not exceed an expected amount the circuitry so far described, is used to control the automatic operation of the system. That is, it responds to a Transfer signal from the sample processor indicating that a volatilizable sample is in the volatilization chamber 16. It controls the sample volatilization and its flushing out by means of one shots 86 and 87. It monitors the ion beam current and controls the vidicon camera to convert the images on its target to electrical signals when the sample has been completely ionized ($I_B < I_T$) and after the completion of the READ operation and at the end of the 2-minute period from the Transfer signal, it commands the sample processor 10 by means of the Step signal on line 21 to supply a new volatilizable sample to the volatilization chamber 16.

However, the control unit includes additional circuitry to account for other than normal conditions. For example, let it be assumed that as a sample is ionized the integrated beam current $I_I$ from monitor B exceeds a predetermined level $I_X$, which when related to the target 76 of the vidicon unit 75 represents the maximum desirable exposure of the target 76. To protect the target from overexposure the control unit includes a comparator 118 which provides a high output on line 118*a* when $I_I \geqq I_X$. When line 118*a* goes high it sets FF120 so that its Q output on line 122 goes high. Line 122 is connected to the shutter of the shutter-diaphragm unit 73. When it goes high it closed the shutter, thereby interrupting the further exposure of the target 76 by images (light) directed thereto by the fiber optics 70. Also line 122 is connected to OR gate 100 which sets FF102 to provide the READ command to the vidicon unit 75. Thus, when the target 76 reaches maximum exposure it is read out even though the total sample ionization is not completed.

When the READ operation is completed by the vidicon unit 75 and the READ COMPLETE signal is received on line 104 FF120 is reset and the shutter is opened. Also monitor B is reset through OR gate 124. When monitor B is reset which also takes place under normal operating conditions when Reset line 115 goes high, it starts to integrate the beam current once more. It is thus seem that the control unit includes circuitry to prevent the vidicon target from overexposure. If, before the complete ionization of the sample $I_I \geqq I_X$ once more, the shutter would again be closed and the vidicon unit would perform a second READ operation. The electrical signals supplied to the data processor 15 from one or more such READ operations are combined in the processing of the signals for the sample which is being analyzed.

Hereinbefore it was assumed that under normal conditions the analysis of an average sample (excluding processing by data processor 15) requires less than two minutes. Consequently for the average sample at the end of the first two minute period gate 110 is enabled and a new sample is transferred to the chamber 16. If however due to an unexpected large amount of sample or for some other unforeseen reason at the end of the first two minute period the analysis is not complete gate 110 is not enabled. The incomplete analysis may be indicated by the fact that the READ operation of the vidicon unit has not been completed, in which case FF102 is still in its set state and therefore line 106 is low, or $I_B \geqq I_T$ in which case the output of inverter 112 is low.

In accordance with the present invention line 90*a* (output of timer 50) is connected to one input of an AND gate 128, and lines 92*a* and 103 are connected to an OR gate 130 whose output is connected to the second input of gate 128. If at the end of the first two-minute period the analysis is not complete, namely either $I_B \geqq I_T$ so that line 92*a* is high and/or the READ operation is not complete so that line 103 is high, gate 130 is enabled, enabling gate 128 to provide a pulse to a counter 132. For explanatory purposes counter 132 is assumed to count up to 3. The first pulse from gate 128 advances the counter 132 to a count of one (1). If at the end of the second 2-minute period the analysis is still not complete a second pulse is provided by gate 128, incrementing the count in counter 132 to two. Then, if at the end of the third 2-minute period the analysis is still not complete a third pulse is supplied to the counter 132, causing it to reach a full count. Consequently, its output on line 134 is high enabling an OR gate 135 whose output on line 136 becomes high. When line 136 goes high it indicates a FAIL condition. Line 136 may be connected to illuminate a fail indicator 138 which is on the front panel of the control unit. Line 136 may also be used to activate an alarm 139 to alert an operator to inspect the system and determine the reason why the analysis was not completed in $2 \times 3 = 6$ minutes, when the expected normal analysis completion time is assumed to be two minutes.

If however, before the end of the second or third 2-minute period the analysis is completed both inputs to OR gate 130 are low, and therefore it does not enable AND gate 128 to clock the counter 132. Only AND gate 110 is enabled and a new sample is supplied. Under such conditions the counter 132 never reaches a full count of three and, therefore, the FAIL condition is not indicated. When the gate 110 is enabled the counter 132 which is connected to Reset line 115 is reset to a zero count. From the foregoing it is thus seen that in accordance with the present invention the control unit includes circuitry to enable the system to remain in its automatic mode and analyze a sample during a period up to six minutes, which is larger than the expected average analysis period of two minutes. Only when the analysis of the sample exceeds six minutes is the automatic operation interrupted, and operator takes over to determine the reason for the FAIL condition.

As is appreciated by those familiar with the art the ionization chamber 31 of MS 35 has to be protected from becoming saturated by an excessive flow rate of the volatilized sample to be ionized. To this end valves 36 and 37 (see FIG. 1) are incorporated in the flow path of the volatilized sample from chamber 16 to the ionization chamber. The control unit includes a differential amplifier 140 (FIG. 3) to which the instantaneous beam current $I_B$ from monitor A is supplied. Also supplied to amplifier 140 is a reference current $I_p$ which is related to the maximum desirable flow rate of sample into the ionization chamber 16. The output of amplifier 140 on line 142 is supplied to controller 39 of the inlet valve 37 which is actually a throttle flow control valve. In operation as long as $I_B$ is considerably less than $I_p$ valve 37 is fully open. However, as the sample flow rate increases, and $I_B$ approaches $I_p$ the output of amplifier 140 on line 142 increases. It in turn activates controller 39 to activate valve 37 so as to restrict the sample flow rate therethrough. Under most operating conditions valve 37 together with its controller 39 and the circuitry just described would be sufficient to prevent excessive sample flow rate to the ionization chamber, and thereby prevent its saturation. However, it is possible, though not likely, that even with the above described circuitry the flow rate may still be much higher than desirable and thereby damage the ionization chamber and possibly the MCA 52. The damage to the latter may result from extremely intense dispersed ion beams or overpressure of the MS, produced due to the extremely excessive flow rate of volatilizable sample into the ionization chamber 31.

In order to prevent such undesirable conditions from occurring valve 37 and its controller 38 together with circuitry to be described are included in the system. Valve 37 is assumed to be a 2-position valve. In one position referred to as the Normal position sample from chamber 16 flows through the valve 36 to valve 37. In the other valve position, referred to as the Vent position sample from chamber 16 flows through the valve 36 and is vented through a vent 150 (see FIG. 1). Thus, in this position the flow of volatilized sample to the ionization chamber is completely terminated.

In the control unit the instantaneous beam current $I_B$ is compared with a reference current $I_{MAX}$ (see FIG. 4) in a comparator 152. $I_{MAX}$ which is greater than $I_p$, represents a maximum beam current which if exceeded indicates extremely high sample flow rate which may damage the ionization chamber and/or the MCA. In operation, when $I_B \geq I_{MAX}$ the output of comparator 152 on line 154 goes high, thereby triggering a one shot 155. The latter, upon being triggered, provides an output pulse 156 of duration $t_3$ on its output line 158 which is connected to the input of a counter 160 assumed to be a count-by-2 counter. The pulse 156 increments the count in counter 160 from 0 to 1. More importantly, output line 158 is connected via line 162 and the valve controller 38. The latter upon sensing the leading edge of pulse 156 switches valve 36 to the vent position, thereby terminating the flow of sample to the ionization chamber. During the duration $t_3$ of pulse 156 the volatilized sample is vented through vent 150. Also connected to output line 158 is a line 164 which is connected to the MCA power source 58. The leading edge of pulse 156 deactivates power source 58 thereby removing the potentials applied to the MCA 52 and the phosphored plate 56. The removal of these potentials protects the MCA from any damage due to excessively intense dispersed ion beams.

At the end of the pulse period $t_3$ power source 58 is reactivated and controller 38 switches valve 36 back to the normal position. If however despite the venting of part of the sample through vent 150, $I_B$ is still equal or greater than $I_{MAX}$, output line 154 remains high and the one shot 155 provides a second pulse on its output line 158. This second pulse increments the count in counter 160 to 2, causing its output on line 166 to go high. Since line 166 is connected as one input to OR gate 135 the latter is enabled and provides the FAIL condition signal to indicator 138 and/or alarm 138. Clearly, if desired counter 150 may be other than a count-by-two counter so that more than one sample venting cycle may take place before the FAIL condition is produced.

If however at the end of the first period $t_3$, $I_B < I_{MAX}$, the output line 154 of comparator 152 is low and therefore one shot 155 is not retriggered. Consequently, the count in counter 160 remains one. The counter is reset via line 115 when AND gate 110 is enabled, and a STEP command for a new sample is supplied to the sample processor 10.

As shown in FIG. 1 the control unit 20 is also connected to the data processor 15. Whenever gate 110 is enabled and a STEP command is produced the enabled output of gate 110 is supplied to the data processor 15 via line 168 to indicate to the processor 15 that the signals received from the vidicon unit 75, since a previous instant in time when line 168 was high, are from one sample and that a new sample is being introduced into chamber 16. Also, whenever a FAIL condition arises the processor 15 is informed thereof via line 170 which is connected to OR gate 135. Based on the prior identifications of the samples as they are fed into the sample processor 10 the processor determines which sample is in the system while the failure occurred and which samples are still in the sample processor 10. Furthermore, any failure in the data processor 15 may be fed to the control unit 20 via line 172 to activate OR gate 135, indicating a FAIL condition which alerts the operator.

As is appreciated by these familiar with MSs, commercially available MSs include the power units which supply the required voltages and current to the ionization chamber to the electric and magnetic sectors and the required pumps. The various voltages and currents are generally indicated on dials in a display panel. The latter also includes control knobs and/or switches by means of which an operator may independently vary the voltages and currents. Also, in many MSs power or vacuum failures are automatically sensed to shut off the appropriate power supplies and thereby prevent damage to the MS.

In accordance with the present invention any failure automatically detected in the MS is supplied to OR gate 135 of the control unit to indicate the FAIL condition.

In FIGS. 1 and 3 lines 174 and 175 are assumed to supply a fail-indication condition from power source 43 and the MS pumps 45, respectively. Furthermore, the control unit is assumed to include circuitry to monitor the various voltages and currents supplied by power source 43 in MS 35, and the voltages supplied by power source 58 to MCA 52 and the phosphored plate 56. Based on the monitored voltages and currents they are automatically adjusted to optimal preselected levels. Some of the adjustments may occur on a continual basis, while others may take place only between analysis steps, namely while one cartridge which has previously contained an analyzed sample is ejected from chamber 16 and a second cartridge with a new volatilizable sample is transferred thereto.

It should be appreciated that various known circuits including comparators, differential amplifiers and servo motors may be used by those familiar with the art in many different arrangements to monitor and control the power sources. Therefore, providing specific details for power source monitoring and control is not believed to be necessary. In FIG. 4 block 180 represents a power source monitor and control unit. The input lines 181 to unit 180 represent the lines through which the various voltages and currents provided by the power sources 43 and 58 are supplied to block 180 for monitoring. Based on the monitored voltages and currents, control signals are supplied by unit 180 on lines 182 to sources 43 and 58 to adjust, whenever necessary, the voltages and current to the preselected optimal levels.

As an example, and not for purposes of limiting the invention thereto, unit 180 may include three differential amplifiers 181, 192 and 193 (see FIG. 4) which are respectively supplied with signals corresponding to the electron current, designated $I_Z$, the accelerating voltage, designated $V_A$ and the ionizing voltage, designated $V_I$ which the MS power source 43 assumed to supply to the ionization chamber 31. In amplifier 191, $I_Z$ is compared with an optimal electron current $I_O$ and when $I_Z$ deviates from $I_O$ the output of the amplifier 191 is other than zero. It is supplied to power source 43 to adjust $I_Z$ until the output of amplifier 191 is zero thereby indicating that $I_Z = I_O$. Similarly, $V_A$ may be compared with an optimal accelerating voltage $V_A$, and the output of amplifier 192 may be used in power source 43 to adjust the accelerating voltage until $V_A = V_A'$. Likewise, $V_I$ may be compared with an optimal ionization voltage $V_I$, and the output of amplifier 193 may be used to control source 43 so that $V_A$ becomes equal to $V_A'$.

Hereinbefore it was assumed that sample processor 10 includes its separate control unit which in addition to responding to the STEP signal from control unit 20 and providing the TRANSFER signal thereto, also control the automatic processing of the samples fed thereinto from feeder 12, so that each processed sample is in its volatilizable state or is converted into its characteristic volatilizable derivative. Any fail condition in the sample processor may also be supplied to OR gate 135 via line 195 and thereby alert the operator. In FIG. 1 the volatilization chamber 16 is shown as a separate unit. In practice it can be part of the processor 10 as its output stage or may be regarded as the input stage of the MS 35.

Although the invention has been described in connection with the sample processor 10 and the data processor 15, it is not intended to be limited thereto. The invention may also be viewed as comprising of the volatilization chamber 16, the MS 35, the EOID 50 and the control unit 20. When so viewed, the sample processor 10 can be thought of as an input stage, which contains a sequence of volatilizable samples in separate cartridges. In response to a STEP signal the input stage ejects a previously inserted cartridge from chamber 16 and transfers the first sample-containing cartridge in the sequence into the chamber 16. The identification on the cartridge may be read by optical reader 13 just prior to the cartridge transfer into the chamber 16. Data processor 15 may be viewed as an output stage to which electrical signals are supplied. The signals are indicative of the components of the sample, which is being analyzed, and their abundances.

Although the invention has been described in connection with the vidicon unit 75, it is not intended to be limited thereto. The separate electron beams emerging from the MCA back end 54 are accelerated to the phosphored plate 56, where they are converted to photon images as hereinbefore described. These photon images may be detected by a variety of means other than vidicon unit 75. One such means may be a photodiode array placed adjacent to phosphored plate 56 or else optically linked to plate 56 by means of fiber optics of the type hereinbefore described. In this arrangement each of the individual elements of the photodiode array would be exposed to the photon output of a very small area of plate 56 such that all photons impinging on any one photodiode array element could be attributed to no more than one of the separate ion beams emerging from magnetic sector 42. The photon current impinging on each element of the photodiode array may be converted to an electrical signal which may be supplied to the data processor 15 by means which are well known in the art.

It must furthermore be appreciated that the invention is not limited to the use of a phosphored plate 56 to detect the electron beams emerging from MCA back end 54. These electron beams constitute electrical signals which may be monitored by other means. This may be accomplished by an arrangement which may best be described in connection with FIG. 6. Therein, numerals 221*a*, 221*b*, 221*c* designate separate ion beams emerging from magnetic sector 42 to enter the microchannels of MCA 52. Therein the ions produce secondary electron beams 231*a*, 231*b*, 231*c* which exit the back end 54 of the MCA. An array of current collectors represented by 230 is space apart from the MCA back end 54, and a potential difference is applied between the elements of collector array 230 and the MCA back end 54 to accelerate the electron beams 231 from the MCA back end 54 to the collector array 230. The data processor 15 may monitor the separate electron currents from MCA back end 54 to the separate elements of collector array 230 in a variety of ways well known in the art. Thus, electron beams 231*a*, 231*b*, and 231*c* may be detected as individual electron currents from MCA back end 54 to collector array elements 230*a*, 230*b* and 230*c*, respectively. It may be appreciated that such currents could be monitored continuously by data processor 15 without recourse to the READ signal hereinbefore described. Also the currents may be monitored only when control signals are applied to the elements of array 230. These control signals may be supplied at a preselected rate, or based on the time of introduction of a sample to be volatilized. One can view these control signals as READ signals to the elements of array 230.

Hereinbefore, the invention has been described in connection with an embodiment in which the beam current in the single ion beam is monitored by the current probe 80, before the single beam is separated into several ion beams by the magnetic sector 42. It should be stressed that the invention is not intended to be limited thereto. For example, if desired, the current in one or more of the separate ion beams, which exit the magnetic sector 42, and which are of particular interest may be monitored to provide the required control signal. This may be accomplished by an arrangement which may best be described in connection with FIG. 5. Therein, numeral 220 designates the single ion beam which is directed to the magnetic sector 42, and 221*a*, 221*b*, 221*c*, 221*d*, . . . 221*n* designate n separate ion beams, which are separated by the magnetic sector 24 in accordance with the ions' mass-to-charge ratios. All the n beams are assumed to be focused at focal plane 53.

In the particular arrangement, diagrammed in FIG. 5, it is assumed that only ion beams 221*b*, 221*c* and 221*n* are of interest. In such a case only the currents in these three ion beams are to be monitored to provide the required control signal. In FIG. 5 three separate ion current detectors or probes 223, 224 and 225 are diagrammed. They respectively monitor the currents in beams 221*b*, 221*c* and 221*n*. The output signals of the three detectors are applied to a signal adder 228, which adds the three output signals and provides an output on line 82 (see FIGS. 1 and 3) which is indicative of the sum of the currents in the three ion beams of interest. The use which is made of the output on line 82 has been described hereinbefore in detail and, therefore, will not be repeated. For definition purposes the monitored ion current in one or more of the separate ion beams is defined as $I_B'$ to distinguish it from $I_B$, hereinbefore referred to as the monitored current in the single ion beam. Since beams 221*b* and 221*c* are adjacent to one another the two detectors 223 and 224 may be replaced by a single detector, which is sufficiently long to intercept the two beams. For definition purposes, the detectors, such as detectors 223, 224 and 225 and the signal adder 228 may be regarded as "means for detecting ion currents" in selected ion beams.

From the foregoing it should thus be appreciated that in accordance with the invention the control signal may be provided by monitoring the currents in one or more of the ion beams which are separated by the magnetic sector. If some of the ion beams of interest lie in a particular range of mass-to-charge ratio, such as beams 221*b* and 221*c*, a single detector may be used to monitor the currents in the beams of interest in the particular range. The provision of the ultimate READ signal as a function of the ion current in one or more selected ion beams, rather than as a function of the current in the single ion beam 220, before the latter is separated in the magnetic sector 42, may be desirable in certain instances. For example, if the volatilized sample contains a large amount of reagents, in which only a very small amount of one or more compounds of interest are dissolved, it may be desirable to provide the READ signal, when the beams of interest have peaked rather than when the single beam, containing mostly ions of the reagents which are not of interest, has peaked.

In some applications the system may be used to analyze a series of similar samples. In such a case the time from a reference point in time, e.g., the instant of introduction of each processed sample into the chamber 16 (see FIG. 1) until the beam of a given sample in the series peaks may be determined. Then, based thereon, the READ signal may be provided. For example, let it be assumed that the time interval from the instant a sample in the series or run of similar samples is injected into chamber 16 until the beam current reaches a level when the READ signal is to be provided is known, assumed to be equal to z minutes. In such a case, a resettable timer capable of measuring z minutes may be used. The timer may be reset as each sample is introduced into the chamber 16, and then used to measure z minutes. At the end of z minutes the timer output can be used to provide the signal, needed to produce the READ signal. Thus, the READ signal may be generated on a time basis, rather than by monitoring current in either the single ion beam before it is separated into the several beams, or in one or more separate beams of interest.

If desired a reference sample with known compounds may be passed through the system after every group of a preselected number of samples. The data, which is processed by data processor 15 (see FIG. 1) for the reference sample may be used to automatically adjust the time interval, measured by the timer, to insure that for each processed sample the READ signal is provided at the proper time. Alternatively, the time interval measured by the timer may be adjusted manually to provide optimum performance for a particular series of samples.

Hereinbefore it has been assumed that when the READ signal is provided it is applied only once for each sample supplied to chamber 16, or else several times for each sample if the sample quantity were so large as to risk overexposure of the detector. However it may be desirable in some instances to provide the READ signal periodically several times or many times for each sample supplied to chamber 16, regardless of detector protection requirements. For example, a sample supplied to chamber 16 may be composed of several chemical components of varying volatility, such that each component achieves a peak ion current at a time different from each of the other components. In this instance it may be desirable to ascertain the profile of ion current with respect to time for several of the separate ion beams. To achieve this, one may provide the READ signal every y seconds, where y is a short period of time with respect to the time required to volatilize all of the sample in chamber 16. Thus, the total mass spectrum for the sample would be segmented into a series of successive mass spectra of y seconds duration, from which the profile of ion current versus time for the separate ion beams could be ascertained. The period y, and hence the frequency of the READ signal, could be preset to an appropriate interval for the type of sample being processed.

Although particular embodiments of the invention have been described and illustrated herein, it is recognized that modifications and variations may readily occur to those skilled in the art and consequently, it is intended that the claims be interpreted to cover such modifications and equivalents.

The embodiments of the invention in which an exclusive property or privilege is claimed are defined as follows:

1. An analysis system comprising:

volatilization chamber means adapted to volatilize a sample supplied thereto;

mass spectrometric means to which said volatilized sample is supplied for generating therefrom an ion beam and thereafter separating said ion beam into a plurality of separate ion beams at least some of which are simultaneously focused at a substantially common focal plane;

detection means for simultaneously converting n of said focused ion beams into electrical signals where n being greater than one;

means for detecting the ion currents in m of said n ion beams, where m being less than n and equal or greater than one;

control means for providing control signals to said detection means to control the conversion of said n ion beams into electrical signals as a function of the ion current detected in said m ion beams; and output means for receiving said electrical signals.

2. The system as described in claim 1 wherein said detection means includes means for converting said n ion beams into electron beams and sensing means for providing said electrical signals to said output means as a function of the currents detected in said m electron beams and wherein said control means provide a control signal to said sensing means to cause the latter to provide said electrical signals.

3. The system as described in claim 1 wherein said detection means includes first means for converting said n ion beams into images and second means for converting said images into said electrical signals and wherein said control means provide a control signal to said second means to control the conversion of said images into said electrical signals by said second means.

4. The system as described in claim 1 wherein said detection means includes means for converting said n ion beams into electron beams and sensing means for providing said electrical signals to said output means as a function of the currents detected in said m ion beams and further including input means for providing a succession of volatilizable samples, a volatilizable sample being provided every p minutes, said input means including transfer means responsive to a Step signal from said control means for transferring a volatilizable sample, provided by said input means, into said volatilization chamber means, and for supplying a Transfer signal to said control means upon the completion of the transfer of a volatilizable sample to said volatilization chamber means, said control means including means responsive to said Transfer signal for activating said volatilization chamber means to volatilize the sample transferred thereto from said input means.

5. The system as described in claim 4 wherein said control means includes means for providing said Step signal only if the detected ion currents in said m ion beams decreased to some predetermined threshold level prior to the end of a period of kp minutes from the time said Transfer signal has been received, where k is an integer greater than zero and not greater than an integer f.

6. The system as described in claim 1 wherein said detection means includes first means for converting said n ion beams into images and second means for converting said images into said electrical signals and further including input means for providing a succession of volatilizable samples, a volatilizable sample being provided every p minutes, said input means including transfer means responsive to a Step signal from said control means for transferring a volatilizable sample, provided by said input means, into said volatilization chamber means, and for supplying a Transfer signal to said control means upon the completion of the transfer of a volatilizable sample to said volatilization chamber means, said control means including means responsive to said Transfer signal for activating said volatilization chamber means to volatilize the sample transferred thereto from said input means.

7. The system as described in claim 6 wherein said control means includes means for providing said Step signal only if the detected ion currents in said m ion beams decreased to some predetermined threshold level prior to the end of a period of kp minutes from the time said Transfer signal has been received, where k is an integer greater than zero and not greater than an integer f.

8. The system as described in claim 6 wherein said second means provide a Conversion Complete signal to said control means upon the completion of the conversion of said images into said electrical signals, and said control means includes means for providing said Step signal only if said Conversion Complete signal is received prior to the end of a period kp minutes from the time said Transfer signal has been received, where k is an integer greater than zero and not greater than an integer f.

9. An analysis system comprising:

volatilization chamber means adapted to receive a volatilizable sample for volatilizing said sample therein;

mass spectrometer means for ionizing a volatilized sample, supplied thereto, to form a single ion beam, and for dispersing ions in said single ion beam to simultaneously produce a plurality of separate ion beams, at least some of said separate ion beams being focused at a substantially common focal plane;

coupling means between said volatilization chamber means and said mass spectrometer means for providing a path for the sample, volatilized in said volatilization chamber means, to said mass spectrometer means;

ion converting means for simultaneously converting n of said focused ion beams into electrical signals in response to control signals which are supplied thereto, where $n \geqq 1$, said ion converting means including first means for converting the n ion beams into electron beams, and second means for providing said electrical signals which are related to the currents in said n electron beams;

output means for receiving the electrical signals from said ion converting means; and control means for supplying said control signals to said second means of said ion converting means, each control signal being supplied to said second means at a preselected point in time which is related to the time a sample is supplied to said volatilization chamber.

10. An analysis system comprising:

volatilization chamber means adapted to receive a volatilizable sample for volatilizing said sample therein;

mass spectrometer means for ionizing a volatilized sample supplied thereto, to form a single ion beam, and for dispersing ions in said single ion beam to simultaneously produce a plurality of separate ion beams, at least some of said separate ion beams being focused at a substantially common focal plane;

coupling means between said volatilization chamber means and said mass spectrometer means for providing a path for the sample volatilized in said volatilization chamber means to said mass spectrometer means;

ion converting means for simultaneously converting n of said focused ion beams into electrical signals in response to control signals which are supplied thereto, where $n \geqq 1$;

output means for receiving the electrical signals from said converting means;

control means for supplying said control signals to said ion converting means; and input means for providing a succession of volatilizable samples, a volatilizable sample being provided every p minutes, said input means including transfer means responsive to a Step signal from said control means for transferring a volatilizable sample, provided by said input means, into said volatilization chamber means, and for supplying a Transfer signal to said control means upon the completion of the transfer of a volatilizable sample to said volatilization chamber means, said control means including means responsive to said Transfer signal for activating said volatilization chamber means to volatilize the sample last transferred thereto from said input means.

11. The system as described in claim 10 wherein said control means include means for detecting the ion currents in m of said n ion beams where $n \geqq m \geqq 1$, and means for providing each control signal to said converting means as a function of the detected currents.

12. The system as described in claim 11 wherein said converting means include first means for converting said n ion beams into electron beams and second means responsive to each control signal from said control means for converting said electron beams into said electrical signals.

13. The system as described in claim 12 wherein said converting means provide a Complete signal to said control means upon the completion of the conversion of said n ion beams into electrical signals and said control means further include means for providing said Step signal only if said Complete signal is received prior to the end of a period of kp minutes from the time said Transfer signal has been received, where k is greater than zero and not greater than an integer f.

14. The system as described in claim 12 wherein said second means comprise means for converting said electron beams into images and means responsive to each control signal from said control means for converting said images into said electrical signals.

15. The system as described in claim 14 wherein said converting means provide a Complete signal to said control means upon the completion of the conversion of said images into electrical signals, and said control means further include means for providing said Step signal only if said Complete signal is received prior to the end of a period of kp minutes from the time said Transfer signal was received, where k is greater than zero and not greater than an integer f.

16. An analysis system comprising:

mass spectrometer means to which a volatilized sample is adapted to be supplied for generating therefrom an ion beam and for separating said ion beam into a plurality of separate ion beams, at least some of which are simultaneously focused at a substantially common focal plane, each separated beam containing ions of a different atomic mass unit (amu);

detection means including means for simultaneously converting n of said focused ion beams into electron beams and sensing means for providing electrical signals as a function of the currents in said electron beams, where n≧1 and includes ion beams with atomic mass units which differ from one another by x units, where x is on the order of 1 or more;

output means for receiving said electrical signals; and control means for applying control signals to said sensing means at preselected times which are related to the time a sample is supplied to said mass spectrometer means to control the provision of said electrical signals by said sensing means to said output means.

17. An analysis system comprising:

volatilization chamber means adapted to volatilize a sample supplied thereto;

mass spectrometric means to which said volatilized sample is supplied for generating therefrom an ion beam and thereafter separating said ion beam into a plurality of separate ion beams, at least some of which are simultaneously focused at a substantially common focal plane;

detection means for simultaneously converting n of said focused ion beams into electrical signals, where n≧1;

output means for receiving said electrical signals; and control means for controlling said detection means to provide said electrical signals only during each of a succession of equal time durations which are equally spaced in time from one another, said equal time durations being independent of the amplitudes of said electrical signals.

18. The system as described in claim 17 wherein said detection means includes means for converting said n ion beams into electron beams, and sensing means for providing said electrical signals to said output means which are related to said electron beams and said control means include means for controlling said sensing means to provide said electrical signals to said output means.

19. The system as described in claim 17 wherein said detection means includes first means for converting said n ion beams into images and second means for converting said images into said electrical signals.

20. The system as described in claim 19 wherein said control means include means for applying control signals to said second means to control the conversion of said images into said electrical signals.

21. An analysis system comprising:

volatilization chamber means adapted to volatilize a sample supplied thereto;

mass spectrometric means to which said volatilized sample is supplied for generating therefrom an ion beam and thereafter separating said ion beam into a plurality of separate ion beams, at least some of which are simultaneously focused at a substantially common focal plane;

detection means including means for converting n of said simultaneously focused ion beams into electron beams, where n≧1, and sensing means for providing electrical signals which are related to said electron beams;

output means for receiving said electrical signals; and control means for applying control signals to said sensing means for controlling the latter to provide said electrical signals to said output means only when the sum of the currents in selected ones of said electron beams has first reached a preselected level.

22. An analysis system comprising:

volatilization chamber means adapted to volatilize a sample supplied thereto;

mass spectrometric means to which said volatilized sample is supplied for generating therefrom an ion beam and thereafter separating said ion beam into a plurality of separate ion beams, at least some of which are simultaneously focused at a substantially common focal plane;

detection means including means for converting n of said focused ion beams into electron beams, where n≧1, and sensing means for providing electrical signals which are related to said electron beams only in response to a control signal applied to said sensing means;

output means for receiving said electrical signals; and control means for controlling said sensing means to provide said electrical signals to said output means, said control means including means for applying a control signal to said sensing means only at a preselected time which is after the time said sample is first supplied to said volatilization chamber.

23. An analysis system comprising:

volatilization chamber means adapted to receive a volatilizable sample for volatilizing said sample therein;

mass spectrometer means for ionizing a volatilized sample supplied thereto, to form a single ion beam, and for dispersing ions in said single ion beam to simultaneously produce a plurality of separate ion beams, at least some of said separate ion beams being focused at a substantially common focal plane;

coupling means between said volatilization chamber means and said mass spectrometer means for providing a path for the sample volatilized in said volatilization chamber means to said mass spectrometer means;

ion converting means for simultaneously converting n of said focused ion beams into electrical signals, where n≧1; and circuit means including output means for receiving the electrical signals from said converting means only during preselected equally-spaced time durations which are independent of said electrical signals.

24. The system as described in claim 23 wherein said circuit means include control means for applying control signals which are equally spaced in time to said converting means to control the conversion of said ion beams into said electrical signals.

25. The system as described in claim 23 wherein said converting means includes first means for converting the n ion beams into electron beams, and second means for providing said electrical signals which are related to the currents in said n electron beams.

26. The system as described in claim 25 wherein said control means supply said control signals to said second means to control the provision of said electrical signals.

27. An analysis system comprising:

volatilization chamber means adapted to receive a volatilizable sample for volatilizing said sample therein;

mass spectrometer means for ionizing a volatilized sample supplied thereto, to form a single ion beam, and for dispersing ions in said single ion beam to simultaneously produce a plurality of separate ion beams, at least some of said separate ion beams being focused at a substantially common focal plane;

coupling means between said volatilization chamber means and said mass spectrometer means for providing a path for the sample volatilized in said volatilization chamber means to said mass spectrometer means;

ion converting means for simultaneously converting n of said focused ion beams into electrical signals only when said ion converting means receive control signals which are supplied thereto, at discrete instances in time, separated by time intervals during which control signals are not supplied to said ions converting means, where $n \geqq 1$;

output means for receiving the electrical signals from said converting means; and control means for supplying said control signals to said ion converting means, said control means including means for detecting the ion currents in m of said n ion beams where $n \geqq m \geqq 1$, and means for providing each control signal to said converting means as a function of the detected currents in said m ion beams.

28. The system as described in claim 27 wherein said converting means include first means for converting said n ion beams into electron beams and second means responsive to each control signal for said control means for converting said electron beams into said electrical signals.

* * * * *